(12) United States Patent
Bagheri et al.

(10) Patent No.: US 9,907,056 B2
(45) Date of Patent: Feb. 27, 2018

(54) SYSTEM AND METHOD FOR ALLOCATING RESOURCES FOR DEVICE-TO-DEVICE COMMUNICATIONS

(71) Applicant: Futurewei Technologies, Inc., Plano, TX (US)

(72) Inventors: Hossein Bagheri, Arlington Heights, IL (US); Zhenzhen Cao, Beijing (CN); Philippe Sartori, Plainfield, IL (US); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 662 days.

(21) Appl. No.: 14/452,764

(22) Filed: Aug. 6, 2014

(65) Prior Publication Data
US 2016/0044653 A1 Feb. 11, 2016

(51) Int. Cl.
*H04W 72/04* (2009.01)
*H04W 72/12* (2009.01)
*H04W 76/00* (2018.01)
*H04W 92/18* (2009.01)

(52) U.S. Cl.
CPC ... *H04W 72/0413* (2013.01); *H04W 72/1278* (2013.01); *H04W 76/00* (2013.01); *H04W 72/04* (2013.01); *H04W 92/18* (2013.01)

(58) Field of Classification Search
CPC ......... H04W 72/0413; H04W 72/1278; H04W 76/00
See application file for complete search history.

(56) References Cited

U.S. PATENT DOCUMENTS

| | | | |
|---|---|---|---|
| 2012/0213183 A1 | 8/2012 | Chen et al. | |
| 2014/0328329 A1* | 11/2014 | Novlan | H04W 72/042 370/336 |
| 2015/0078279 A1* | 3/2015 | Ko | H04L 1/1861 370/329 |
| 2015/0139197 A1* | 5/2015 | He | H04W 24/04 370/336 |

(Continued)

FOREIGN PATENT DOCUMENTS

| CN | 102640553 A | 8/2012 |
|---|---|---|
| CN | 103024911 A | 4/2013 |
| WO | 2013091229 A1 | 6/2013 |

OTHER PUBLICATIONS

"3rd Generation Partnership Project; Technical Specification, Group Radio Access Network; Evolved Universal Terrestrial Radio Access (E-UTRA); Physical channels and modulation (Release 11)," 3GPP TS 36.211 V11.4.0, Technical Specification, Sep. 2013, 120 pages.

(Continued)

*Primary Examiner* — Ian N Moore
*Assistant Examiner* — Ronald h Davis
(74) *Attorney, Agent, or Firm* — Slater Matsil, LLP

(57) ABSTRACT

A method for operating a device-to-device (D2D) device includes determining, by the D2D device, availability of a D2D buffer status report (BSR) resource. The method also includes in response to determining that the D2D BSR is not available, generating, by the D2D device, a D2D scheduling request (D2D-SR) message in accordance with D2D-SR configuration information and transmitting, by the D2D device, the D2D-SR message in a D2D-SR resource when the D2D-SR resource is available.

19 Claims, 16 Drawing Sheets

(56) References Cited

U.S. PATENT DOCUMENTS

| | | | |
|---|---|---|---|
| 2015/0282234 A1* | 10/2015 | Sartori | H04W 76/023 |
| | | | 370/329 |
| 2015/0327312 A1* | 11/2015 | Burbidge | H04W 76/023 |
| | | | 370/329 |
| 2016/0095131 A1* | 3/2016 | Seo | H04W 72/085 |
| | | | 370/329 |
| 2016/0277922 A1* | 9/2016 | Gunnarsson | H04W 8/26 |

OTHER PUBLICATIONS

"3rd Generation Partnership Project; Technical Specification, Group Radio Access Network; Evolved Universal Terestrial Radio Access (E-UTRA); Physical layer procedures (Release 11)," 3GPP TS 36.213 V11.101, Technical Specification, Dec. 2012, 160 pages.
Demin, Z., et al. "Improvement of BSR and SR delivery in LTE systems," Study on Optical Communications, Received Date Feb. 22, 2012, 4 pages.
"3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.2.0, Jun. 2011, 54 pages.
"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Jun. 2011, 294 pages.
International Search Report for Application No. PCT/CN2015/086033, dated Nov. 3, 2015, 11 pages.

\* cited by examiner

SYSTEM AND METHOD FOR ALLOCATING RESOURCES FOR DEVICE-TO-DEVICE COMMUNICATIONS

TECHNICAL FIELD

The present disclosure relates generally to digital communications, and more particularly to a system and method for allocating resources for device-to-device (D2D) communications.

BACKGROUND

Device-to-Device (D2D) technology is getting a lot of attraction because of the ability to offer new services, improve system throughput, and the like. Next generation wireless communication protocols are likely to implement D2D communication modes, where mobile stations communicate directly with one another rather than relaying wireless signals through an intermediate cellular infrastructure, e.g., cell towers, and the like. D2D communication may have a variety of practical advantageous, such as extending the coverage area of a cell or wireless local area network.

SUMMARY OF THE DISCLOSURE

Example embodiments of the present disclosure which provide a system and method for allocating resources for device-to-device (D2D) communications.

In accordance with an example embodiment of the present disclosure, a method for operating a device-to-device (D2D) device is provided. The method includes determining, by the D2D device, availability of a D2D buffer status report (BSR) resource. The method also includes in response to determining that the D2D BSR resource is not available, generating, by the D2D device, a D2D scheduling request (D2D-SR) message in accordance with D2D-SR configuration information, and transmitting, by the D2D device, the D2D-SR message in a D2D-SR resource when the D2D-SR resource is available.

In accordance with another example embodiment of the present disclosure, a method for operating a device-to-device (D2D) device is provided. The method includes transitioning, by the D2D device, from a second D2D mode to a first D2D mode, and triggering, by the D2D device, a first buffer status report (BSR) message to request a resource allocation to transmit direct data.

In accordance with another example embodiment of the present disclosure, a device-to-device (D2D) device is provided. The D2D device includes a processor, and a transmitter operatively coupled to the processor. The processor determines availability of a D2D buffer status report (BSR) resource, and generates a D2D scheduling request (D2D-SR) message in accordance with D2D-SR configuration information when the D2D BSR resource is not available. The transmitter transmits the D2D-SR message in a D2D-SR resource when the D2D-SR resource is available and when the D2D BSR resource is not available.

One advantage of an embodiment is that user equipments (UEs) can request resources for a data transmission when there are is insufficient resource availability.

A further advantage of an embodiment is that evolved NodeBs (eNBs) can prioritize resource allocations for cellular traffic and D2D traffic to meet communications system condition.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to resource allocation for D2D communications. For example, a D2D device determines availability of a D2D buffer status report (BSR) resource. The D2D device also, in response to determining that the D2D BSR resource is not available, generates a D2D scheduling request (D2D-SR) message in accordance with D2D-SR configuration information, and transmits the D2D-SR message in a D2D-SR resource when the D2D-SR resource is available.

The present disclosure will be described with respect to example embodiments in a specific context, namely communications systems that support network centric D2D operation. The disclosure may be applied to standards compliant communications systems, such as those that are compliant with Third Generation Partnership Project (3GPP), IEEE 802.11, and the like, technical standards, and non-standards compliant communications systems, that support network centric D2D operation.

Figure 1:
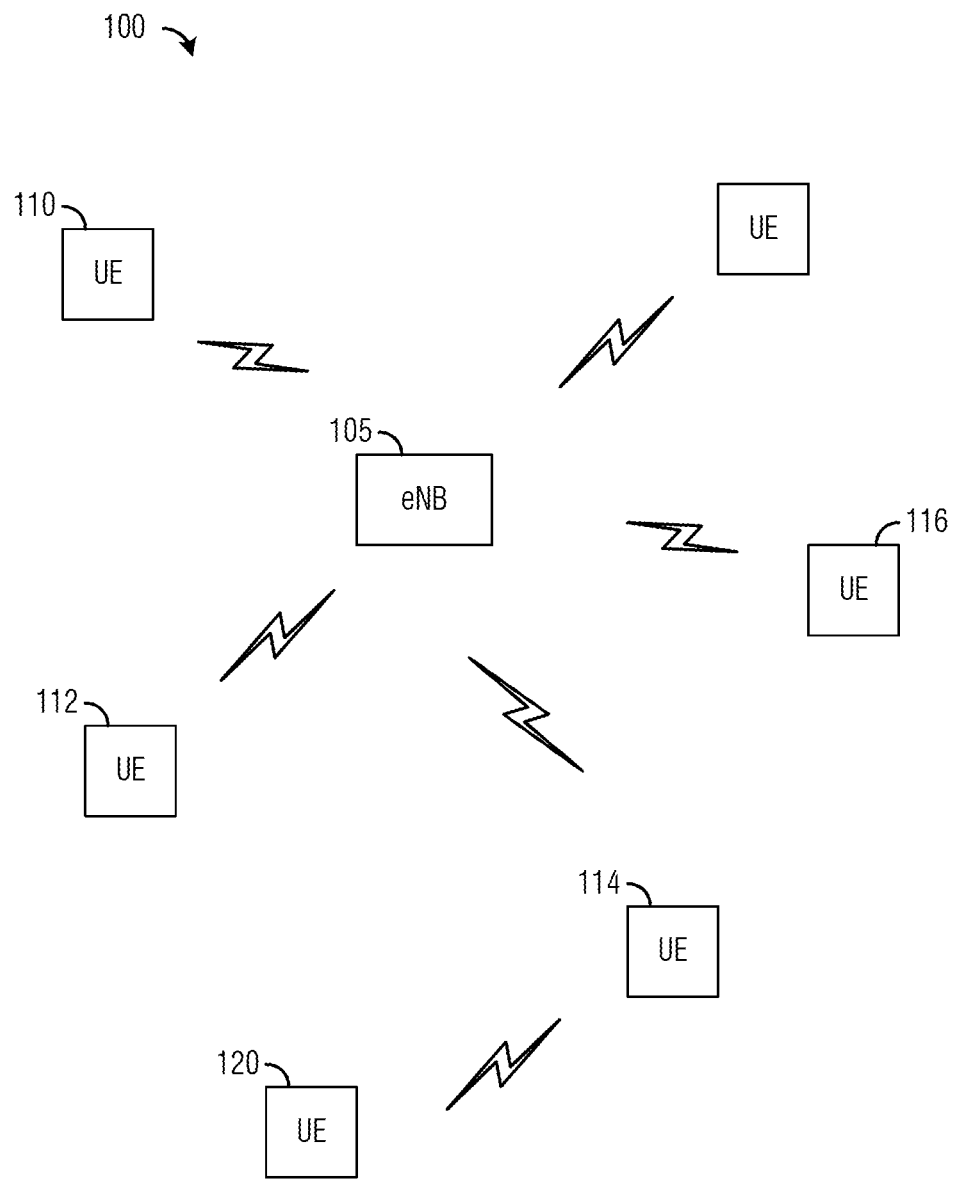
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, UE 112, UE 114, and UE 116. eNB 105 is serving the plurality of UEs by receiving transmission intended for a UE and then forwarding the transmitting to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobiles, mobile stations, terminals, users, subscribers, stations, and the like.

D2D communications is a different operating mode where UEs can directly transmit to one another without having their transmissions being relayed by an eNB. As shown in FIG. 1, UE 114 is communicating directly with UE 120. UE 114 may be capable of communicating in the cellular mode, as well as in the D2D mode. UE 120 is operating in a D2D mode, but it may also be possible that UE 120 is capable of operating in the cellular mode with eNB 105. However, such operations involving UE 120 are not shown in FIG. 1.

While it is understood that communications systems may employ multiple eNBs capable of communicating with a number of UEs, only one eNB, and a number of UEs are illustrated for simplicity.

Generally, there are several ways to implement D2D communications. A first way to implement D2D communications is referred to as device centric. In the device centric approach, the UEs may initiate D2D connections with other UEs without communications system oversight. In fact, D2D communications between UEs may form an overlay on top of the cellular network. The traditional functions of the cellular networks, such as resource allocation and management, are performed in an ad-hoc manner between the individual UEs, without the benefit of network oversight or management. A second way to implement D2D communications is referred to as network centric. In the network centric approach, the communications system initiates a D2D connection when conditions are appropriate. Conditions may include local parameters, such as proximity of UEs, as well as macro parameters, such as overall traffic demand, location of non-D2D UEs, and the like. The network centric approach may be attractive to communications system operators because the D2D operation may enhance the performance of the communications system (such as efficient resource utilization, minimizing interference, and the like), while allowing the operators to bill for services.

Figure 2:
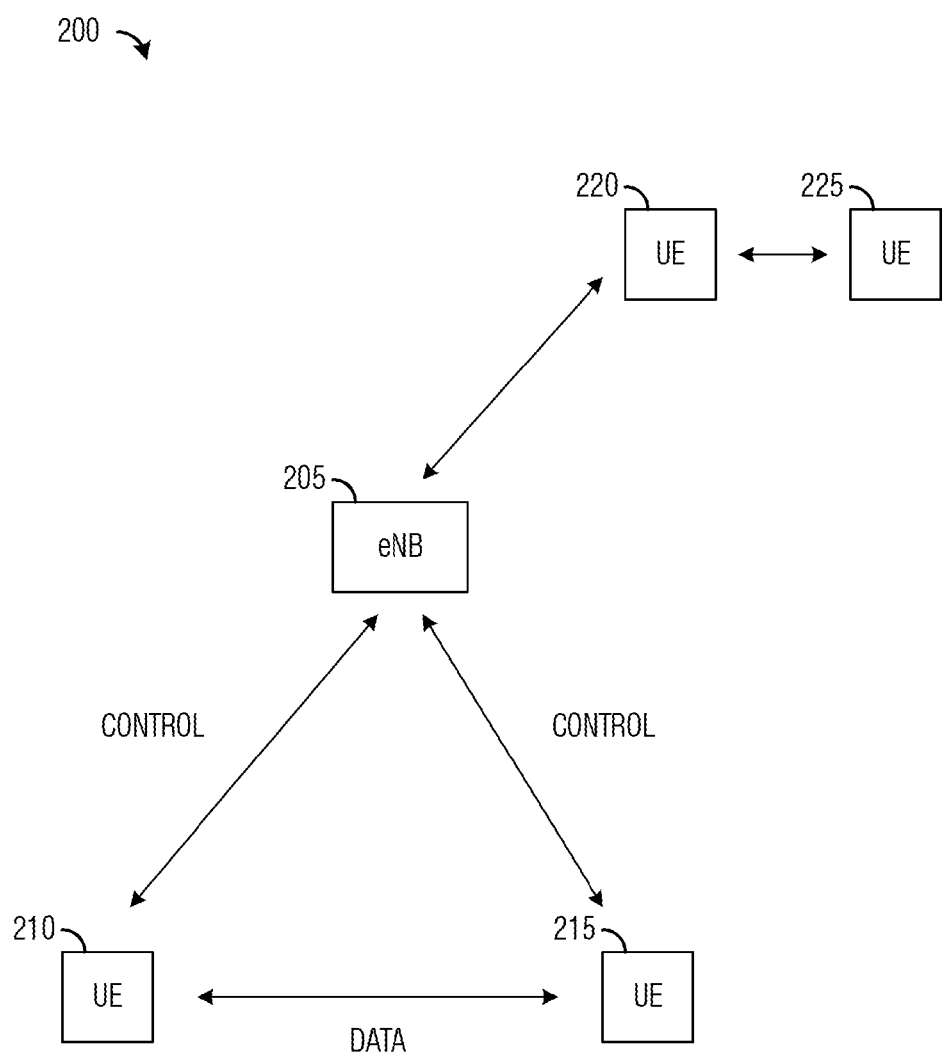
FIG. 2 illustrates an example communications system highlighting network centric D2D operation according to example embodiments described herein.

FIG. 2 illustrates an example communications system 200 highlighting network centric D2D operation. Communications system 200 includes an eNB 205, a first UE 210, and a second UE 215. As shown in FIG. 2, eNB 205 may exchange control signaling with at least one of first UE 210 and second UE 215 to perform D2D operations between first UE 210 and second UE 215. Afterwards, first UE 210 and second UE 215 may exchange data without requiring intervention from eNB 205. In a similar situation, eNB 205 may exchange control signaling with UE 220 to perform D2D operations and UE 220 and UE 225 may exchange data without requiring intervention from eNB 205.

Figure 3:
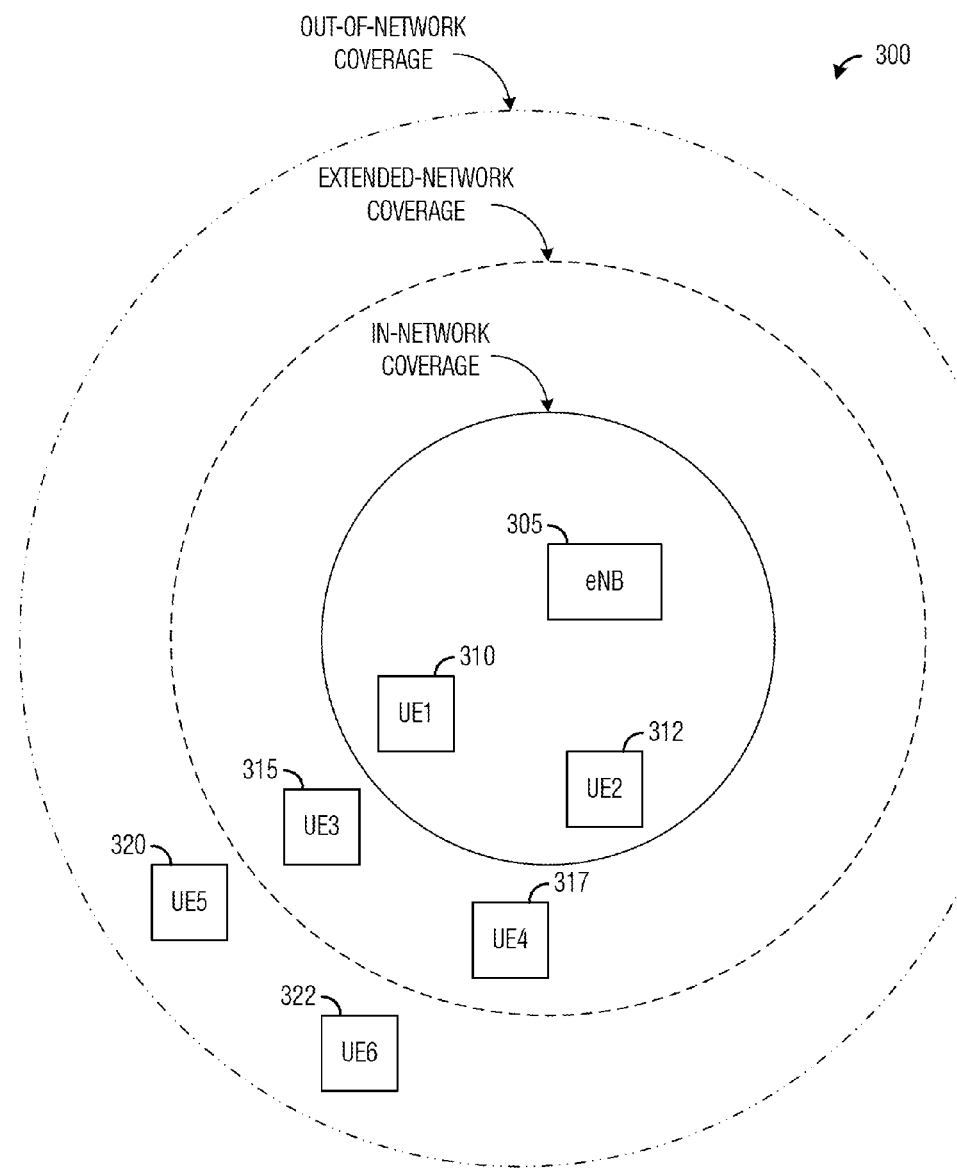
FIG. 3 illustrates an example communications system highlighting device locations according to example embodiments described herein.

FIG. 3 illustrates an example communications system 300 highlighting device locations. As shown in FIG. 3, communications system 300 includes an eNB 305 and a plurality of UEs, including UE 310, UE 312, UE 315, UE 317, UE 320, and UE 322. UEs 310 and 312 are operating in a coverage area of eNB 305 and may be referred to as in-network coverage (IC) UEs, implying that they can establish communications links with eNB 305. UEs 320 and 322 are operating too far away from eNB 305 and may be referred to as out-of-network coverage (OOC) UEs, implying that they cannot establish any direct communications link with eNB 305. UEs 315 and 317 are not IC UEs or OOC UEs, but they may be able to detect some transmissions from eNB 305 but they are typically not able to establish a communications link with eNB 305. These UEs are referred to as extended-network coverage (ENC) UEs.

According to recent Third Generation Partnership Project (3GPP) agreements concerning D2D communications, a UE can operate in two modes for resource allocation:

D2D Mode 1: eNB or relay node (RN) schedules exact resources used by a UE to transmit direct data and direct control information. eNB or RN controls transmission power of scheduling assignment (SA) and data using a physical downlink control channel (PDCCH) or an enhanced physical downlink control channel (EPDCCH); and D2D Mode 2: a UE on its own selects resources from resource pools to transmit direct data and direct control information.

In addition, receiving UEs are notified of the resources where they are to receive the D2D communication by means of a scheduling assignment (SA) transmitted by the transmitting UE. For Mode 1, the location of the resources for transmission of both the SA and D2D data by the transmitting UE are provided by the eNB.

Figure 4A:
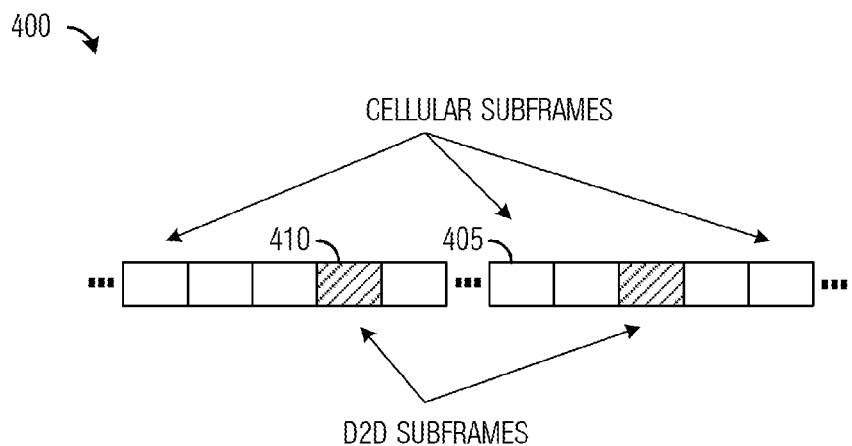
FIG. 4a illustrates example resources with some resources allocated in accordance with D2D Mode 1 according to example embodiments described herein.

FIG. 4a illustrates example resources 400 with some resources allocated in accordance with D2D Mode 1. Resources 400 includes resources allocated for cellular communications, such as resource 405, and resources allocated for D2D communications, such as a subset of resource 410, with the subset of resource 410 being allocated for use by a specific UE(s) for D2D communications.

Figure 4B:
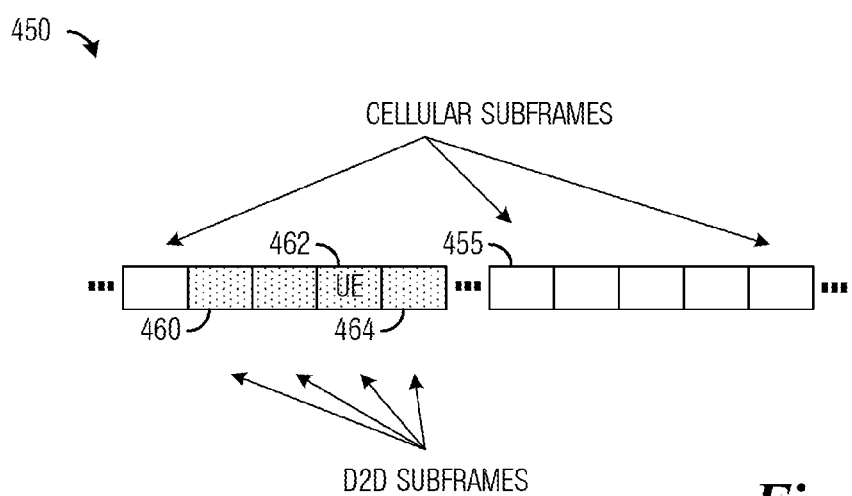
FIG. 4b illustrates example resources with some resources allocated in accordance with D2D Mode 2 according to example embodiments described herein.

FIG. 4b illustrates example resources 450 with some resources allocated in accordance with D2D Mode 2. Resources 450 includes resources allocated for cellular communications, such as resource 455, and resources allocated for D2D communications, such as shaded boxes 460, 462, and 464. As shown in FIG. 4b, one of the shaded boxes (box 462) selected by a UE for D2D communications.

In a 3GPP LTE compliant communications system, the eNB allocates uplink (UL) resources to each UE based on buffer status reports (BSRs) received from the UE. The eNB selects the size of the media access control (MAC) packet data unit (PDU) according to quality of service (QoS) requirements of each configured radio bearer. A BSR can be triggered if the UE has new and/or high priority UL data, or a retransmission, and/or periodic BSR timer expires, or if there is enough padding space in a MAC PDU for sending a padding BSR. If a UE does not have enough allocated UL resources to send a BSR when a trigger for a Regular BSR occurs, the UE sends a scheduling request (SR) in a PUCCH if possible; otherwise the UE transmits a random access channel (RACH) signal. Different PUCCH resource indices (i.e., different cyclic time shift/orthogonal code combinations) in the same PUCCH region can be assigned for SR (PUCCH format 1) or HARQ ACK and/or NACK (PUCCH format 1a/1b) for the same (or different) UEs. The PUCCH resource index to be used by a UE for SR transmission is configured by UE-specific higher-layer signaling. The UE tries to obtain UL resources by sending at most SR_Max SRs. PUCCH Format 3 also allows a SR.

Figure 5A:
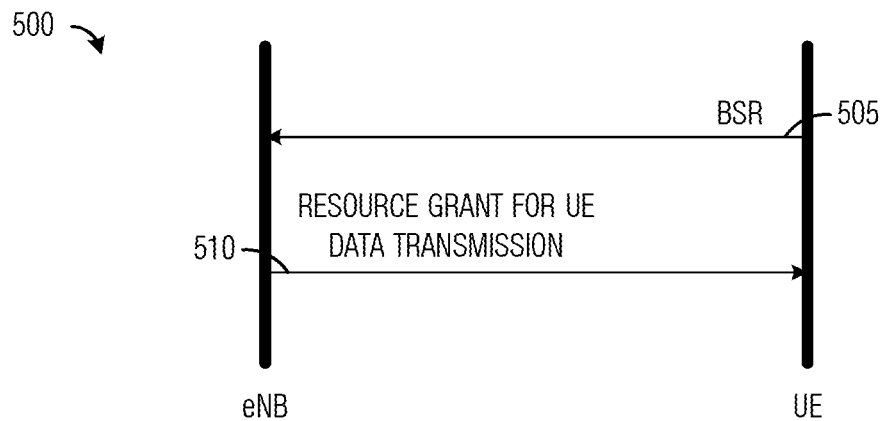
FIG. 5a illustrates a message exchange diagram of example messages exchanged as a UE requests resources for a data transmission according to example embodiments described herein.

FIG. 5a illustrates a message exchange diagram 500 of example messages exchanged as a UE requests resources for a data transmission. Message exchange diagram 500 illustrates messages exchanged between an eNB and a UE as the UE requests resources for a data transmission. The UE may transmit a BSR to the eNB (shown as event 505). The BSR may be transmitted on an UL resource. The eNB may allocate resources (also commonly referred to as a resource grant) to the UE for the data transmission and transmit information about the resource grant to the UE (shown as event 510). The UE may transmit in accordance with the resource grant.

Figure 5B:
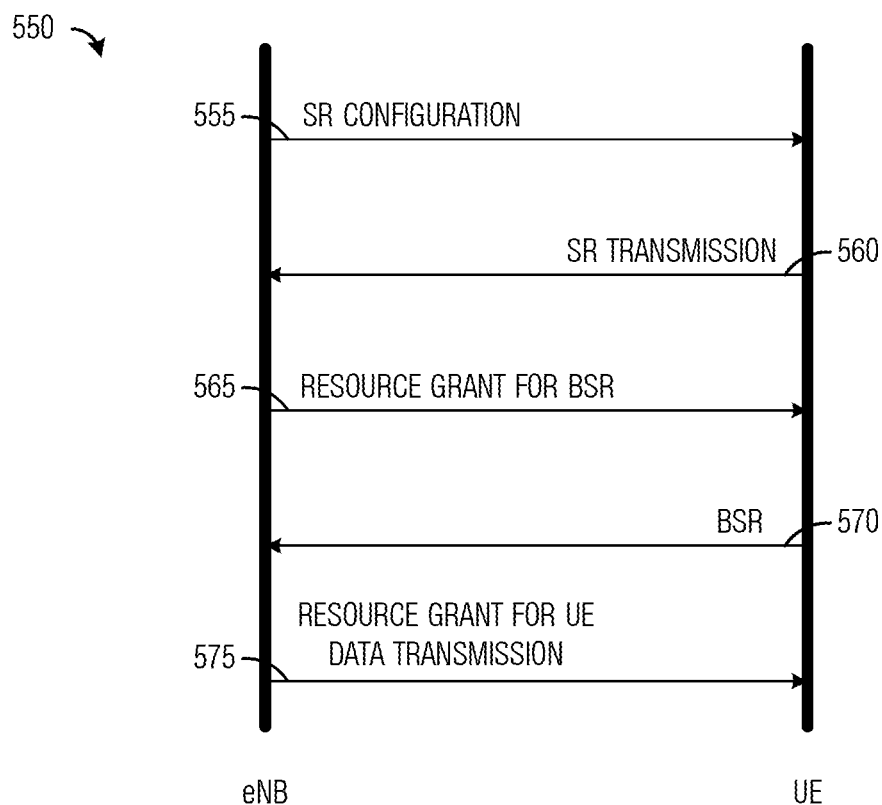
FIG. 5b illustrates a message exchange diagram of example messages exchanged as a UE requests resources for a data transmission when there are insufficient UL resources for a BSR according to example embodiments described herein.

FIG. 5b illustrates a message exchange diagram 550 of example messages exchanged as a UE requests resources for a data transmission when there are insufficient UL resources for a BSR. Message exchange diagram 550 illustrates messages exchanged between an eNB and a UE as the UE requests resources for a data transmission, but there are insufficient UL resources for a BSR. The UE may receive information about a SR (shown as event 555). The information about the SR may inform the UE about where to transmit a SR, which parameters to use, and the like. The UE may transmit a SR requesting that the eNB allocate resources for a BSR (shown as event 560). The eNB may allocate resources for the BSR and transmit information about the resource grant to the UE (shown as event 565). The UE may transmit a BSR to the eNB in accordance with the resource grant (shown as event 570). The eNB may allocate resources to the UE for the data transmission and transmit information about the resource grant to the UE (shown as event 575). The UE may transmit in accordance with the resource grant.

Figure 6:
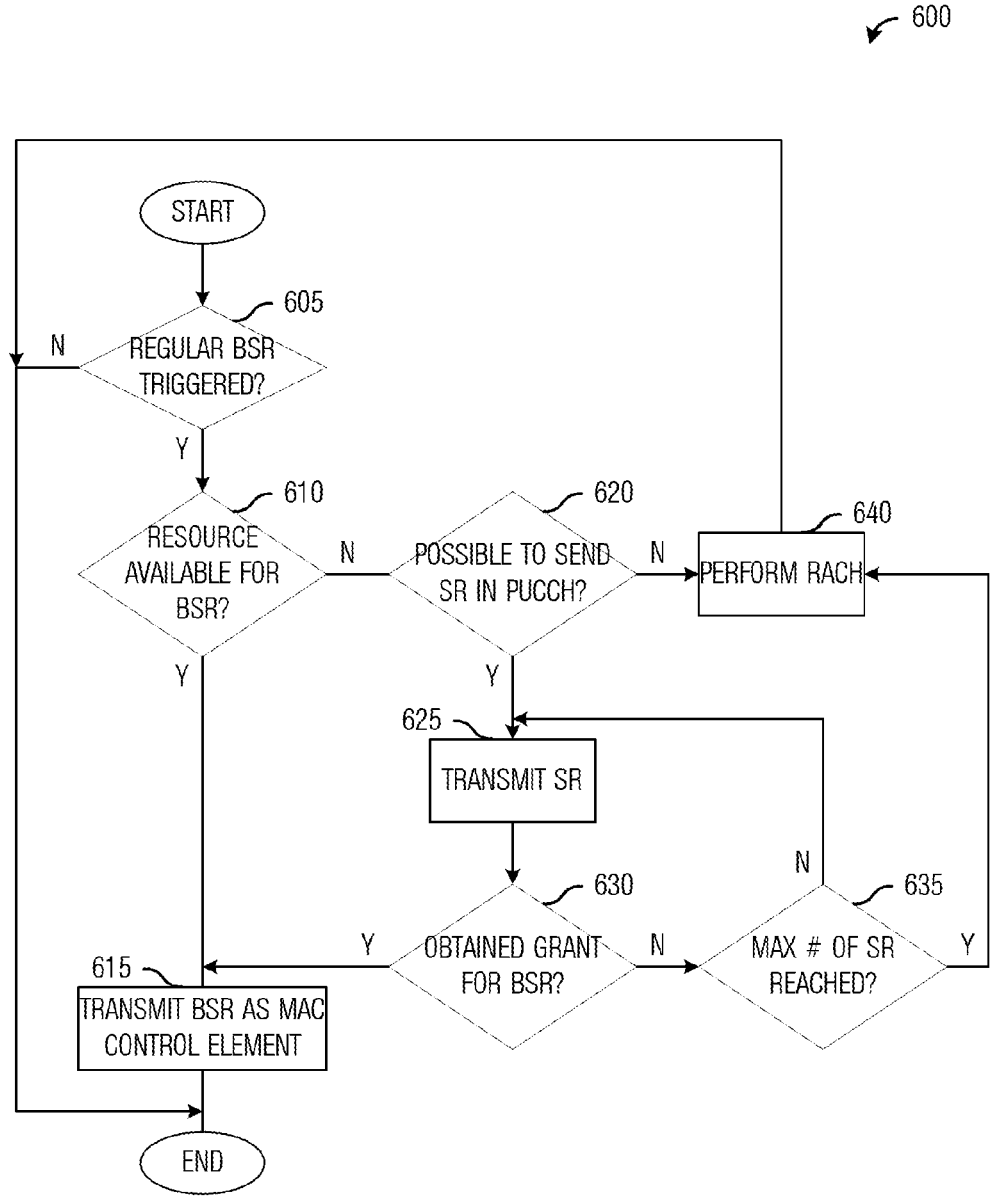
FIG. 6 illustrates a flow diagram of example operations occurring in a UE as the UE requests resources for a data transmission while operating in D2D mode according to example embodiments described herein.

FIG. 6 illustrates a flow diagram of example operations 600 occurring in a UE as the UE requests resources for a data transmission while operating in D2D mode. Operations 600 may be indicative of operations occurring in a UE, such as UE 114 and UE 120, as the UE requests resources for a data transmission while operating in D2D mode.

Operations 600 may begin with the UE performing a check to determine if a BSR is triggered (block 605). In other words, the UE may perform a check to determine if it has data to transmit. If the UE does not have any data to transmit, operations 600 may end.

If the UE does have data to transmit, the UE may determine if there are resources available for it to transmit a BSR (block 610). As an example, the UE may check to determine if there are sufficient resources (e.g., UL resources) for it to transmit the BSR, which may be as small as 5 bytes including a MAC header. If there are sufficient resources for the UE to transmit the BSR, the UE may transmit the BSR as a MAC control element (block 615).

If there are insufficient resources for the UE to transmit the BSR, the UE may perform a check to determine if it is possible to transmit a SR in a PUCCH (block 620). If it is possible for the UE to transmit the SR in the PUCCH, the UE may transmit the SR (block 625). The SR may include a resource request for the BSR. The UE may perform a check to determine if it has received a resource grant for the BSR (block 630). If the UE has received a resource grant for the BSR, the UE may transmit the BSR as a MAC control element in accordance with the resource grant (block 615).

If the UE has not received a resource grant for the BSR, the UE may perform a check to determine if it has transmitted a maximum number of SRs (block 635). In general, there is a limit placed on a number of SRs that the UE is allowed to transmit to help avoid deadlock situations, as well, as to prevent extended waits. If the UE has not transmitted the maximum number of SRs, the UE may return to block 625 to transmit the SR. If the UE has transmitted the maximum number of SRs, the UE may initiate a RACH procedure by transmitting a RACH signal (block 640).

If it is not possible to transmit the SR in the PUCCH, the UE may initiate a RACH procedure by transmitting a RACH signal (block 640).

According to an example embodiment, a UE participating in D2D communications in Mode 1 (and/or in type 2B discovery) may need a D2D-SR (also referred to as a ProSe-SR) and/or a RACH procedure to obtain a resource grant for D2D transmissions. An eNB may schedule an UL resource grant for the UE when it receives an SR from the UE. The typical transport block (TB) size of the UL resource grant may be larger than the size needed to transmit the BSR because for a UE operating with good channel conditions, 1 physical resource block (PRB) can accommodate more bits than the size of a BSR (which may be 5 bytes including a MAC header), and based on traffic statistics, the eNB may be able to estimate that the total size of the UL data waiting in the UE is equal to or more than a certain value (e.g., the size of TCP ACK, 40 bytes). It is efficient to schedule a resource grant with the size equal to or greater than this value.

Furthermore, being able to distinguish D2D-SRs from cellular SRs because the eNB may not want to allocate resources for D2D communications at the moment. Additionally, when a single SR form is used for both D2D-SR and cellular SR, corresponding UE behavior for the two may be different. According to an example embodiment, a system and method for a UE to request a resource allocation for a D2D-BSR when the UE does not have any available resources is provided.

In general, the UE operating in D2D Mode 1 may transmit a D2D-BSR when it has data to transmit. However, if the UE is operating in D2D Mode 2, there is no D2D-SR and/or D2D-BSR. According to an example embodiment, a new trigger for a UE to transmit a D2D-BSR is provided.

Figure 7:
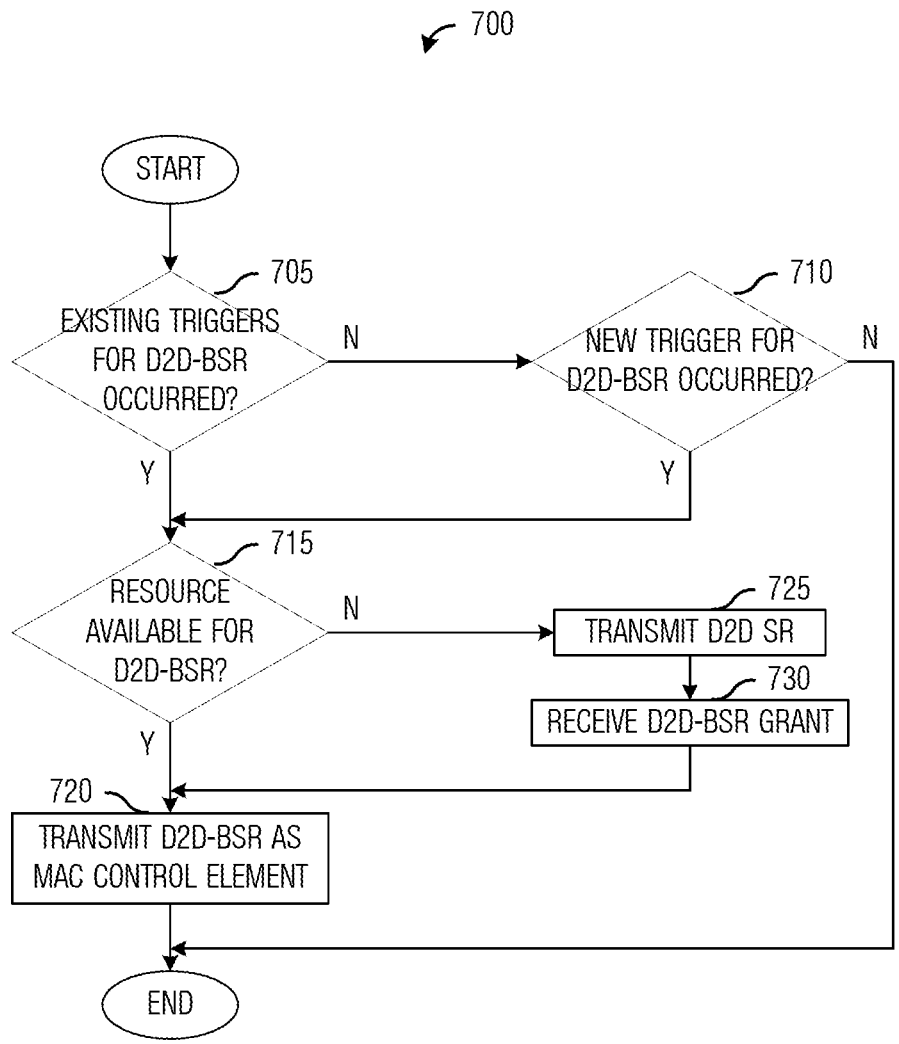
FIG. 7 illustrates a flow diagram of example operations occurring in a UE as the requests a resource allocation for a data transmission while operating in D2D mode with D2D-BSRs and D2D-SRs and associated triggers according to example embodiments described herein.

FIG. 7 illustrates a flow diagram of example operations 700 occurring in a UE as the requests a resource allocation for a data transmission while operating in D2D mode with D2D-BSRs and D2D-SRs and associated triggers. Operations 700 may be indicative of operations occurring in a UE, such as UE 114 and UE 120, as the UE requests resources for a data transmission while operating in D2D mode with D2D-BSRs and D2D-SRs and associated triggers.

Similar triggers for a D2D-BSR to cellular BSR can be defined, which may include the presence of D2D data to transmit when the UE operating in D2D Mode 1, and the like. Such D2D-BSR triggers are referred to as first D2D-BSR triggers. Operation 700 may begin with the UE performing a check to determine if such a trigger(s) for a D2D-BSR has occurred (block 705). If such trigger(s) for a D2D-BSR has not occurred, the UE may perform a check to determine if additional trigger(s) for a D2D-BSR has occurred (block 710). Additional triggers for a D2D-BSR may include the UE transitioning from D2D Mode 2 to D2D Mode 1 and having data to transmit, and the like. Such D2D-BSR triggers are referred to as second D2D-BSR triggers. If neither of first nor second trigger(s) for a D2D-BSR has occurred, operations 700 may end.

If the first trigger(s) for a D2D-BSR has occurred (block 705) or if second trigger(s) for a D2D-BSR has occurred (block 710), the UE may perform a check to determine if resources are available for the UE to transmit a D2D-BSR (block 715). If there are resources available for the UE to transmit a D2D-BSR, the UE may transmit the D2D-BSR to the eNB as a MAC control element (block 720). If there are no resources available for the UE to transmit a D2D-BSR, the UE may transmit a D2D-SR to the eNB (block 725) and receive resource grant information associated with the D2D-SR (block 730). The UE may transmit a D2D-BSR in accordance with the resource grant information (block 720).

Figures 8A, 8B:
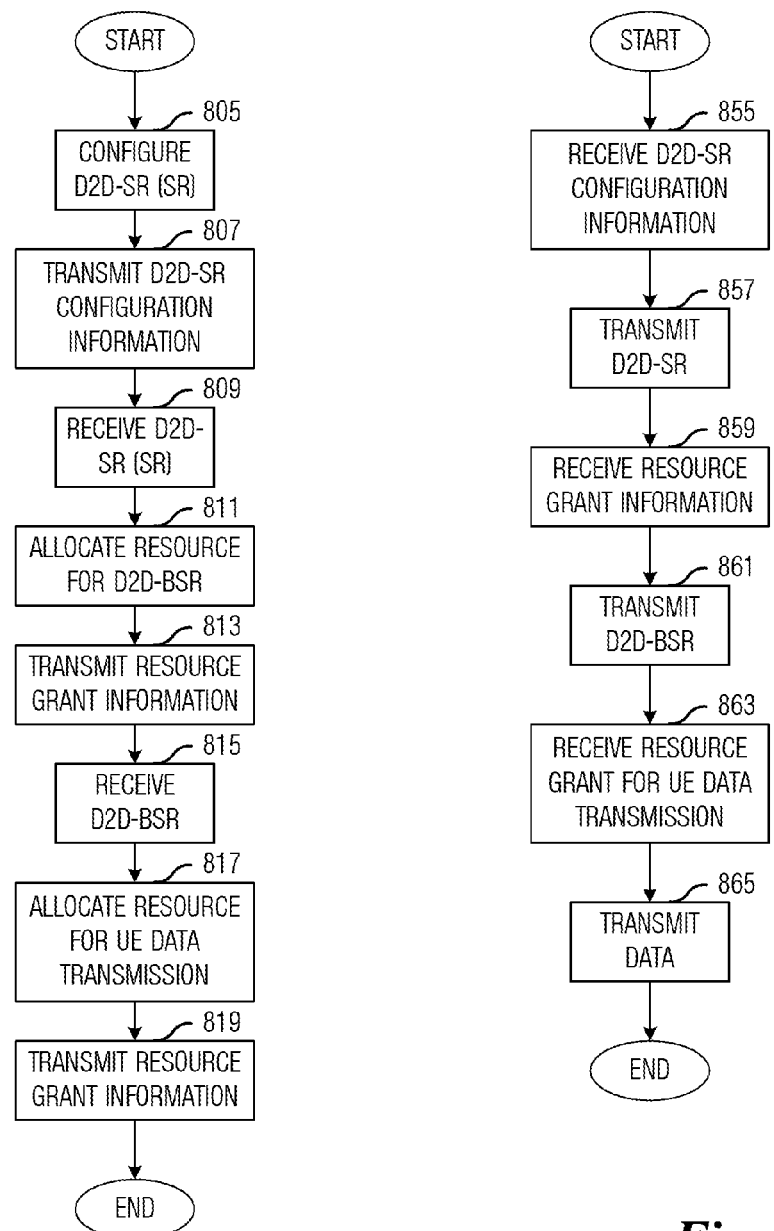
FIG. 8a illustrates a flow diagram of example high-level operations occurring in an eNB as the eNB allocates resources for a D2D data transmission made by a UE according to example embodiments described herein.
FIG. 8b illustrates a flow diagram of example high-level operations occurring in a UE as the UE makes a D2D data transmission according to example embodiments described herein.

FIG. 8a illustrates a flow diagram of example high-level operations 800 occurring in an eNB as the eNB allocates resources for a D2D data transmission made by a UE. Operations 800 may be indicative of operations occurring in an eNB, such as eNB 105, as the eNB allocates resources for a D2D data transmission made by a UE, such as UE 114 and UE 120.

Operations 800 may begin with the eNB configuring D2D-SRs (block 805). According to an example embodiment, a D2D-SR is configured exactly the same as a cellular SR. The D2D-SRs may be configured to be sent in a PUCCH resource allocated for cellular SRs. Allocations of the D2D-SRs may be signaled to the UEs by higher layer signaling. The eNB may later distinguish the type of SR (e.g., cellular SR or D2D-SR) based on a subsequent BSR.

According to another example embodiment, a D2D-SR is configured differently from a cellular SR. The D2D-SRs may be sent in PUCCH resources (with different cyclic time shift, orthogonal code combination, PUCCH regions (i.e., RB locations), and the like, for example) that are different than PUCCH resources assigned for cellular SRs. According to another example embodiment, a D2D-SR is sent in PUCCH format 3 when carrier aggregation (CA) is not enabled. Such a situation is similar to the PUCCH format 3 for time domain duplexing (TDD) operation. According to yet another example embodiment, a D2D-SR is sent in a new PUCCH format. As an example, a new PUCCH format (e.g., PUCCH format 4) may be defined for D2D-SRs. According to yet another example embodiment, a D2D-SR is sent on a subset of subframe (which may be indicated by higher layer signaling (e.g., a system information block (SIB) or dedicated signaling) or in accordance with a formula with parameters provided by higher layer signaling). D2D-SRs and cellular SRs may be sent on different subframes.

The eNB may transmit information about the D2D-SR configuration (block 807). The information about the D2D-SR information may include parameters, resource locations, region locations, subframe information, and the like. The information about the D2D-SR information may be transmitted by higher layer signaling.

The eNB may receive a D2D-SR from a UE (block 809). The D2D-SR may include a request from the UE to transmit a D2D-BSR. The eNB may allocate resources for the D2D-BSR, also commonly referred to as a resource grant (block 811). The eNB may transmit information about the resource grant for the D2D-BSR to the UE (block 813). The eNB may receive the D2D-BSR from the UE (block 815). The D2D-BSR from the UE may specify how many resources the UE needs for its D2D data transmission. The eNB may allocate resource(s) to the UE in accordance with the D2D-BSR (block 817). The eNB may transmit information about the resource grant for the D2D data transmission to the UE (block 819).

FIG. 8b illustrates a flow diagram of example high-level operations 850 occurring in a UE as the UE makes a D2D data transmission. Operations 850 may be indicative of operations occurring in a UE, such as UE 114 and UE 120, as the makes a D2D data transmission.

Operations 850 may begin with the UE receiving information about a D2D-SR configuration from an eNB (block 855). In general, the information may specify how the UE may format and send a D2D-SR to the eNB. The UE may transmit a D2D-SR to the eNB (block 857). The UE may transmit a D2D-SR when one or more trigger events occur. The trigger events may include the presence of data to transmit, the transition from D2D Mode 2 to D2D Mode 1, the absence of sufficient resources to transmit a BSR, and the like. The D2D-SR may be formatted and configured in accordance with the information about D2D-SR configuration received from the eNB. The D2D-SR may include a resource request for a D2D-BSR. The UE may receive information about a resource grant for the D2D-BSR from the eNB (block 859). The UE may transmit the D2D-BSR to the eNB in accordance with the information about the resource grant for the D2D-BSR (block 861). The D2D-BSR may specify how many resources the UE needs for its D2D data transmission. The UE may receive information about a resource grant for the D2D data transmission (block 863). The UE may transmit its data in accordance with the information about the resource grant for the D2D data transmission (block 865).

Figure 9:
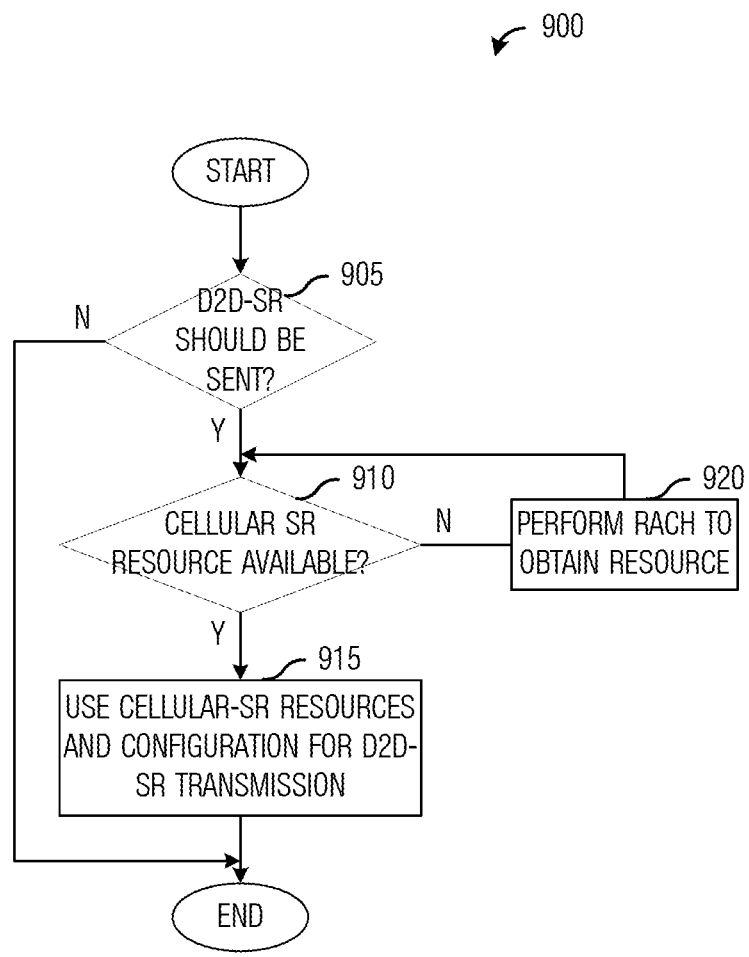
FIG. 9 illustrates a flow diagram of first example operations occurring in a UE as the UE transmits a D2D-SR according to example embodiments described herein.

FIG. 9 illustrates a flow diagram of first example operations 900 occurring in a UE as the UE transmits a D2D-SR. Operations 900 may be indicative of operations occurring in a UE, such as UE 114 and UE 120, as the UE transmits a D2D-SR. Operations 900 may be an example implementation of blocks 620 and 625 of FIG. 6 and/or block 857 of FIG. 8, transmit D2D-SR.

Operations 900 may begin with the UE performing a check to determine if a D2D-SR should be sent (block 905).

As an example, the UE may perform a check to determine if events have occurred to trigger the transmission of a D2D-SR. Examples of trigger events include the presence of data to transmit, the transition from D2D Mode 2 to D2D Mode 1, the absence of sufficient resources to transmit a D2D-BSR, and the like. If a D2D-SR should be sent, the UE may perform a check to determine if cellular SR resources are available (block 910). If cellular SR resources are available, the UE may use a cellular resource(s) and configuration to transmit a D2D-SR to the eNB (block 915). If cellular SR resources are not available, the UE may perform a RACH procedure to obtain a resource(s) to transmit a D2D-BSR (block 920).

Figure 10:
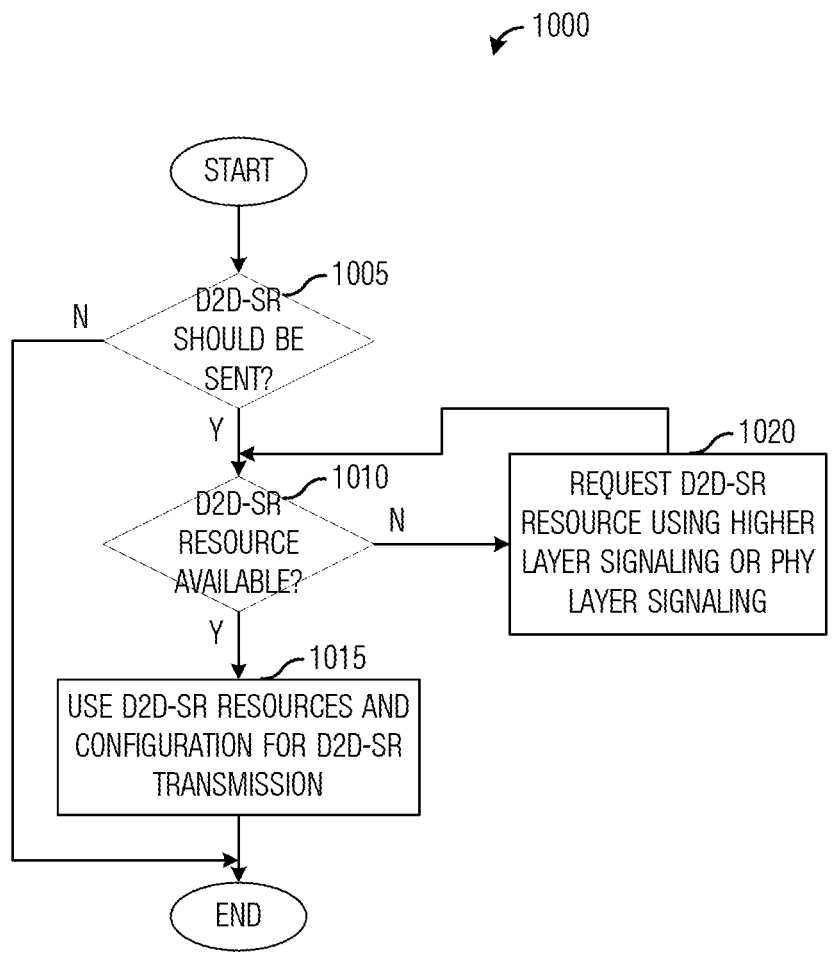
FIG. 10 illustrates a flow diagram of second example operations occurring in a UE as the UE transmits a D2D-SR according to example embodiments described herein.

FIG. 10 illustrates a flow diagram of second example operations 1000 occurring in a UE as the UE transmits a D2D-SR. Operations 1000 may be indicative of operations occurring in a UE, such as UE 114 and UE 120, as the UE transmits a D2D-SR. Operations 1000 may be an example implementation of blocks 620 and 625 of FIG. 6 and/or block 857 of FIG. 8, transmit D2D-SR.

Operations 1000 may begin with the UE performing a check to determine if a D2D-SR should be sent (block 1005). If a D2D-SR should be sent, the UE may perform a check to determine if D2D-SR resources are available (block 1010). Since different PUCCH resources are allocated for cellular SRs and D2D-SRs, the UE may simply check if PUCCH resources allocated for D2D-SRs are available. If D2D-SR resources are available, the UE may use D2D-SR resource(s) and configuration to transmit a D2D-SR resource to the eNB (block 1015). If D2D-SR resources are not available, the UE may request additional D2D-SR resources using higher layer signaling (e.g., dedicated radio resource control (RRC) signaling, MAC signal (e.g., using a given logical channel identifier (LCID), and the like), or physical layer signaling, such as a RACH signal (block 1020).

Figure 11:
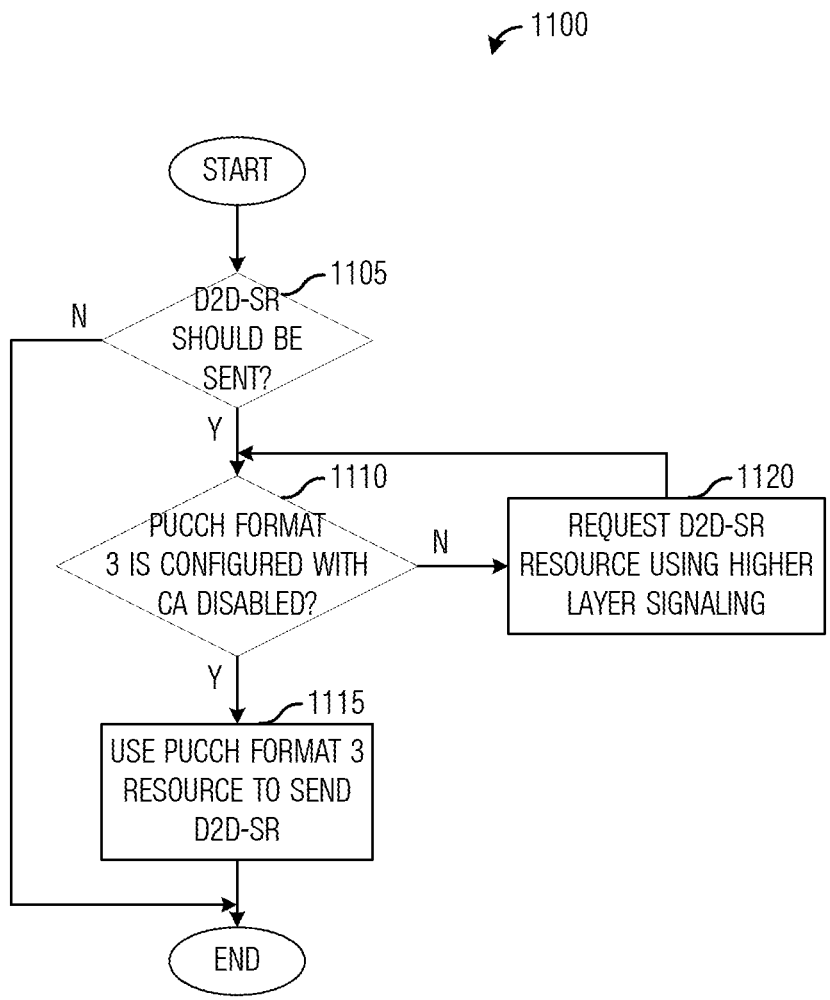
FIG. 11 illustrates a flow diagram of third example operations occurring in a UE as the UE transmits a D2D-SR according to example embodiments described herein.

FIG. 11 illustrates a flow diagram of third example operations 1100 occurring in a UE as the UE transmits a D2D-SR. Operations 1100 may be indicative of operations occurring in a UE, such as UE 114 and UE 120, as the UE transmits a D2D-SR. Operations 1100 may be an example implementation of blocks 620 and 625 of FIG. 6 and/or block 857 of FIG. 8, transmit D2D-SR.

Operations 1100 may begin with the UE performing a check to determine if a D2D-SR should be sent (block 1105). If a D2D-SR should be sent, the UE may perform a check to determine if a PUCCH resource(s) in format 3 is available (block 1110) while a UE is not configured for CA operation. The D2D-SR may be sent in the available resource for format 3. A PUCCH resource in format 3 to be used for D2D-SRs is explicitly signaled to the UE. A set of four resources may be configured using RRC signaling. As an illustrative example, the resource may be selected in accordance with a formula taking a D2D-RNTI, UE identifier, and/or subframe number into account.

If a PUCCH resource(s) in format 3 (when CA is not configured) is available, the UE may use a PUCCH resource in format 3 to send a D2D-SR (block 1115). If a PUCCH resource(s) in format 3 is not available, the UE may request a D2D-SR resource using higher layer signaling (e.g., dedicated radio resource control (RRC) signaling, MAC signal (e.g., using a given logical channel identifier (LCID), and the like), or physical layer signaling, such as a RACH signal (block 1120).

Figure 12:
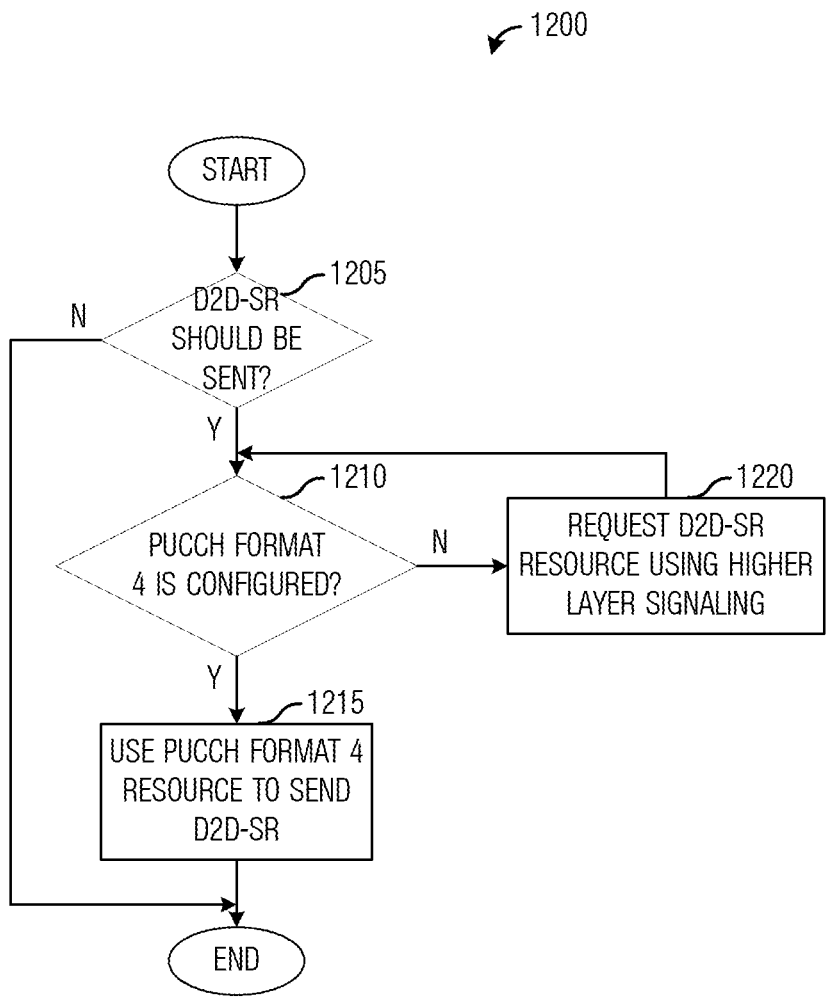
FIG. 12 illustrates a flow diagram of fourth example operations occurring in a UE as the UE transmits a D2D-SR according to example embodiments described herein.

FIG. 12 illustrates a flow diagram of fourth example operations 1200 occurring in a UE as the UE transmits a D2D-SR. Operations 1200 may be indicative of operations occurring in a UE, such as UE 114 and UE 120, as the UE transmits a D2D-SR. Operations 1200 may be an example implementation of blocks 620 and 625 of FIG. 6 and/or block 857 of FIG. 8, transmit D2D-SR.

Operations 1200 may begin with the UE performing a check to determine if a D2D-SR should be sent (block 1205). If a D2D-SR should be sent, the UE may perform a check to determine if a PUCCH resource(s) in format 4 (or some other currently unused format number—i.e., a new format) is configured (block 1210). The PUCCH resources in format 4 may be signaled explicitly to the UE. Format 4 may include an indicator (e.g., 1 bit) for D2D-SRs as well as an indicator (e.g., 1 bit) for cellular SRs. Alternatively, format 4 may include only an indicator (e.g., 1 bit) for D2D-SRs. Cellular SRs may be transmitted using existing PUCCH formats. If a PUCCH resource(s) in format 4 is available, the UE may use a PUCCH resource in format 4 to send a D2D-SR (block 1215). If a PUCCH resource(s) in format 4 is not available, the UE may request a D2D-SR resource using higher layer signaling (e.g., dedicated radio resource control (RRC) signaling, MAC signal (e.g., using a given logical channel identifier (LCID), and the like), or physical layer signaling, such as a RACH signal (block 1220).

Figure 13:
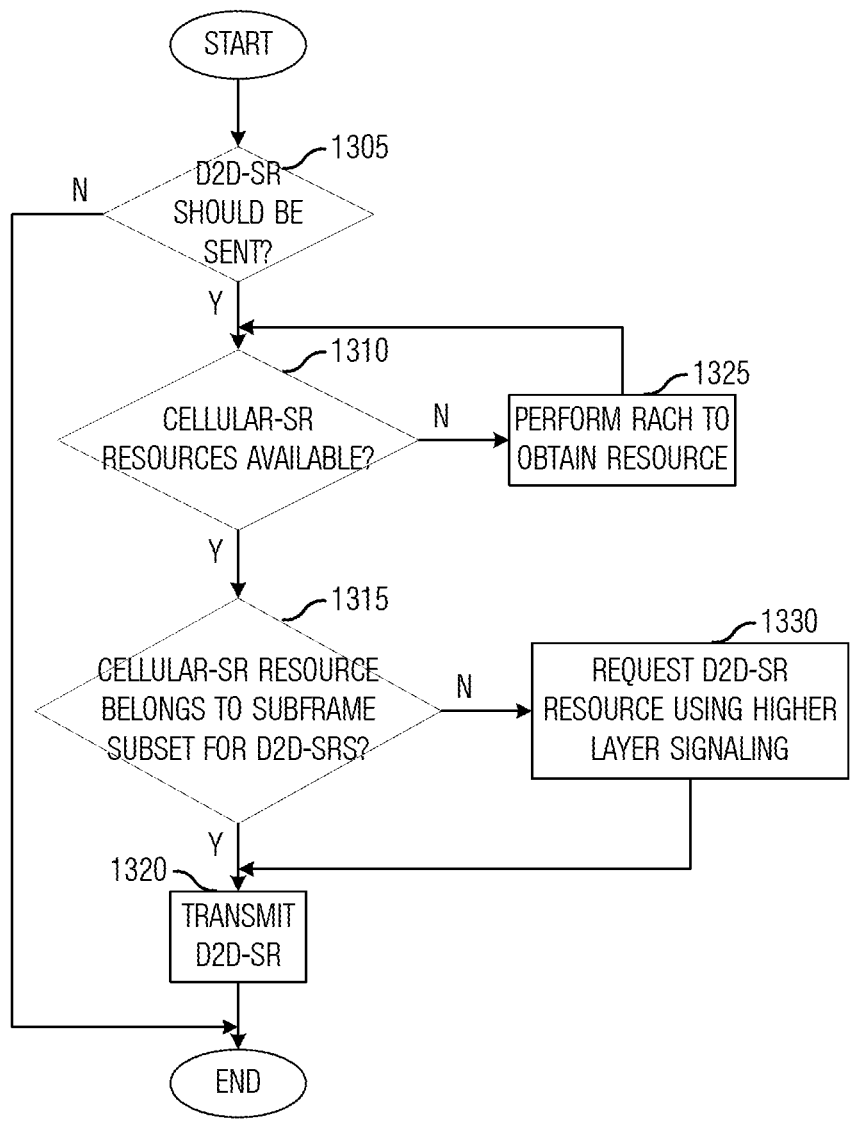
FIG. 13 illustrates a flow diagram of fifth example operations occurring in a UE as the UE transmits a D2D-SR according to example embodiments described herein.

FIG. 13 illustrates a flow diagram of fifth example operations 1300 occurring in a UE as the UE transmits a D2D-SR. Operations 1300 may be indicative of operations occurring in a UE, such as UE 114 and UE 120, as the UE transmits a D2D-SR. Operations 1300 may be an example implementation of blocks 620 and 625 of FIG. 6 and/or block 857 of FIG. 8, transmit D2D-SR.

Operations 1300 may begin with the UE performing a check to determine if a D2D-SR should be sent (block 1305). If a D2D-SR should be sent, the UE may perform a check to determine if a PUCCH resource(s) is available (block 1310). If the PUCCH resource(s) are available, the UE may perform a check to determine if PUCCH resource(s) is available in the subframes that D2D-SR transmissions are allowed to be transmitted (block 1315). According to an example embodiment, different subframe subsets are allocated for cellular SRs and D2D-SRs. The subframe subsets may be cell and/or UE specific. As an example, a new offset may be assigned that is different from an offset for cellular SRs, but using the same SR formula, such as $$(10 \times n_f + \lfloor n_s/2 \rfloor - N_{OFFSET,SR}) \bmod SR_{PERIODICITY} = 0,$$

where $n_f$ is the system frame number, $n_s$ is the slot number within a radio frame, $N_{OFFSET,SR}$ is the SR subframe offset defined in table 10.1.5-1 of 3GPP TS36.213, and $SR_{PERIODICITY}$ is SR periodicity in number of subframes.

The subframe instances that allow potential SR transmissions can be indicated via the formula mentioned above. In case, the subframes allowing SR transmissions for D2D are a subset of the subframes allowing SR transmissions for cellular, the UE may transmit a D2D-SR (block 1320) in the subset subframes if PUCCH resource has been configured. If there are no PUCCH resource(s) is available for even SR transmissions for cellular operation, the UE may perform a RACH procedure to obtain a resource (block 1325). The UE may return to block 1310 to perform a check to determine if PUCCH resource(s) for SR is available. If there is no PUCCH resource available for SR in the subframe subset (block 1315), the UE may request a D2D-SR resource(s) using higher layer signaling (e.g., dedicated radio resource control (RRC) signaling, MAC signal (e.g., using a given logical channel identifier (LCID), and the like), or physical layer signaling, such as a RACH signal (block 1330) and transmit the D2D-SR when the D2D-SR resource(s) is allocated (block 1320).

Generally, if both cellular SRs and D2D-SRs are triggered at the same time (or if both are triggered before a SR opportunity) for a UE, in a situation where one SR is transmitting in a single SR opportunity, the cellular SR takes precedence over the D2D-SR. If the UE has enough resources to send both a cellular BSR and a D2D-BSR, the UE may send both BSRs. Alternatively, only one SR may be sent for both BSR triggers and the communications system for D2D enabled UEs may allocate a different (e.g., larger) resource size to the UE.

In the RAN1 76 technical standards, it has been agreed that in the event of a time domain conflict between an UL WAN transmission (i.e., a cellular transmission) and a D2D transmission and/or reception and/or switching, the UL WAN transmission is always prioritized. In the situation of a D2D-SR, the priority rules and UE behavior may be different. As an example, cellular SRs may be prioritized over D2D-SRs based on the RAN1 76 technical standards. In such a situation, the eNB may need to distinguish D2D-SRs from cellular SRs.

In cellular mode, if a UE needs to transmit a positive SR in the same subframe as another signal, prioritizing rules may include:

1. If a channel state information (CSI) transmission is scheduled, the CSI transmission is dropped and only the SR is transmitted;
2. In the situation of a SRS coinciding with the positive SR in the same subframe, the UE drops the SRS transmission if parameter 'ackNackSRSSimultaneousTransmission' is set to 'FALSE', but transmits the SRS otherwise;
3. If a SR and ACK and/or NACK happen to coincide in the same subframe, the UE transmits the ACK and/or NACK on the assigned SR PUCCH resource for a positive SR and transmits the ACK and/or NACK on its assigned ACK and/or NACK PUCCH resource for a negative SR.

If D2D communication is also in use, and if a UE needs to transmit a positive D2D-SR in the same subframe as another cellular signal, the prioritizing rules may be the same as above or they may be different. An example prioritizing rule that is different may be:

a. If a CSI transmission is scheduled, the D2D-SR is dropped and only the CSI is transmitted.

Figure 14:
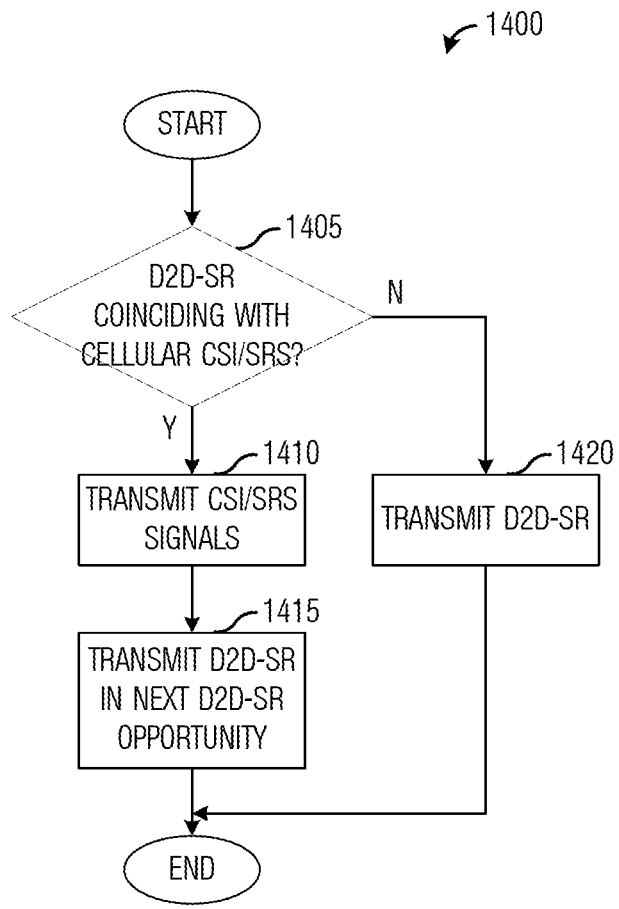
FIG. 14 illustrates a flow diagram of example operations occurring in a UE transmitting a coinciding D2D-SR and cellular signals according to example embodiments described herein.

FIG. 14 illustrates a flow diagram of example operations 1400 occurring in a UE transmitting a coinciding D2D-SR and cellular signals. Operations 1400 may be indicative of operations occurring in a UE, such as UE 114 and UE 120, as the UE transmits coinciding D2D-SR and cellular signals.

Operations 1400 may begin with the UE performing a check to determine if a D2D-SR is coinciding with cellular signals, such as CSI and/or SRS (block 1405). If the D2D-SR is coinciding with cellular signals, the UE may apply a prioritizing rule(s) to determine which signal to transmit. As discussed above, the UE may transmit the cellular signals while dropping the D2D-SR (block 1410). The UE may transmit the D2D-SR in a next available D2D-SR transmission opportunity (block 1415). If the D2D-SR is not coinciding with cellular signals, the UE may transmit the D2D-SR (block 1420).

Figure 15A:
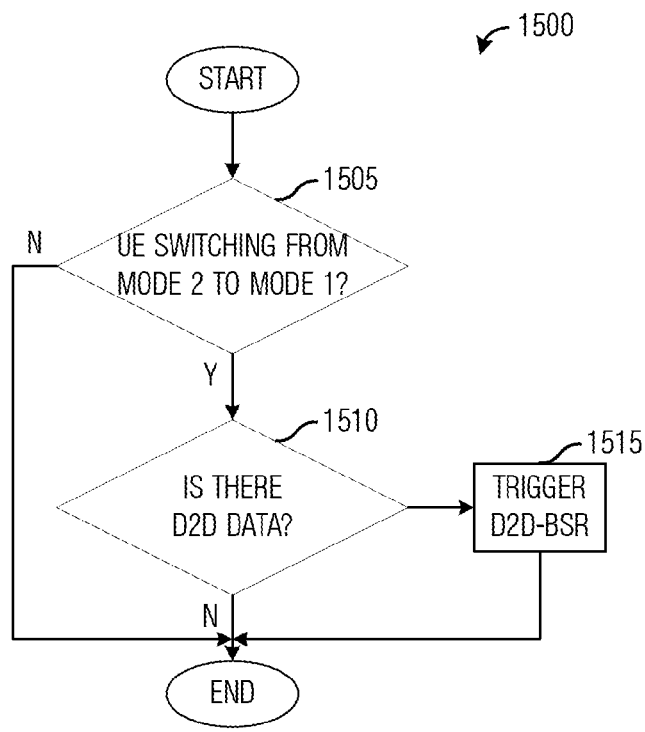
FIG. 15a illustrates a flow diagram of example operations occurring in a UE as the UE transitions from D2D Mode 2 to D2D Mode 1 according to example embodiments described herein.

FIG. 15*a* illustrates a flow diagram of example operations 1500 occurring in a UE as the UE transitions from D2D Mode 2 to D2D Mode 1. Operations 1500 may be indicative of operations occurring in a UE, such as UE 114 and UE 120, as the UE transitions from D2D Mode 2 to D2D Mode 1. Operations 1500 may illustrate a trigger for a D2D-SR.

Operations 1500 may begin with the UE performing a check to determine if it is switching from D2D Mode 2 operation to D2D Mode 1 operation (block 1505). If the UE is switching from D2D Mode 2 operation to D2D Mode 1 operation, the UE may perform a check to determine if it has D2D data to transmit (block 1510). If the UE does have D2D data to transmit, the UE may trigger a D2D-BSR (block 1515). If the UE is not switching from D2D Mode 2 operation to D2D Mode 1 operation or if the UE does not have D2D data to transmit, operations 1500 may end. It is possible that if a UE sends a request to the network to transit to D2D Mode 1, the UE may also send a D2D-BSR along with its request if the UE has D2D data to transmit.

Figure 15B:
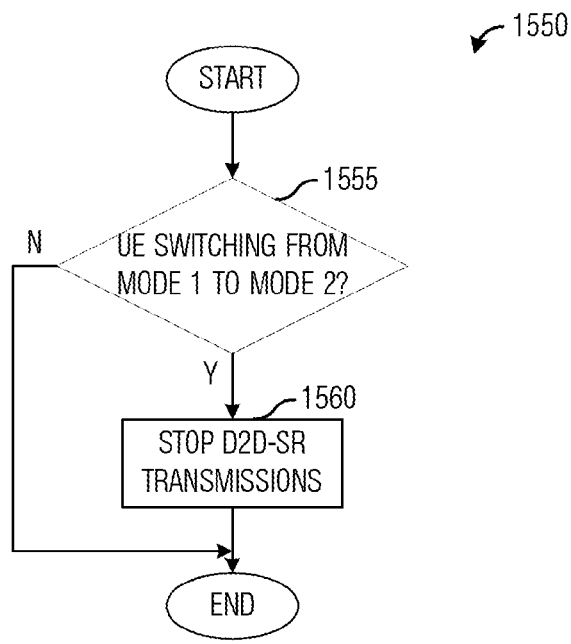
FIG. 15b illustrates a flow diagram of example operations occurring in a UE as the UE transitions from D2D Mode 1 to D2D Mode 2 according to example embodiments described herein.

FIG. 15*b* illustrates a flow diagram of example operations 1550 occurring in a UE as the UE transitions from D2D Mode 1 to D2D Mode 2. Operations 1550 may be indicative of operations occurring in a UE, such as UE 114 and UE 120, as the UE transitions from D2D Mode 1 to D2D Mode 2. Operations 1550 may illustrate when to stop triggering D2D-SRs.

Operations 1550 may begin with the UE performing a check to determine if it is switching from D2D Mode 1 operation to D2D Mode 2 operation (block 1555). If the UE is switching from D2D Mode 1 operation to D2D Mode 2 operation, the UE may stop the transmission of D2D-SRs (block 1560). If the UE has pending D2D-SRs, the UE may stop their transmissions as well. If the UE is not switching from D2D Mode 1 operation to D2D Mode 2 operation, operations 1550 may end.

According to an example embodiment, in a situation when a RACH procedure is needed (to request additional resources, for example), the UE operating in cellular mode may perform the following before initiating the RACH procedure:

Notify RRC to release PUCCH and/or SRS resources for all cells; and

Clear any configured downlink assignments and uplink grants.

However, if the UE is operating in D2D mode, the UE may not need to perform the above operations. Furthermore, in a situation when the UE transitions from D2D Mode 1 to D2D Mode 2 operation inside the coverage area of the communications system, the UE may stop D2D-SR transmissions (as shown in FIG. 15*b*) and transitions from D2D Mode 2 to D2D Mode 1 operation may trigger D2D-BSRs if there is D2D data to be sent (as shown in FIG. 15*a*).

Figure 16:
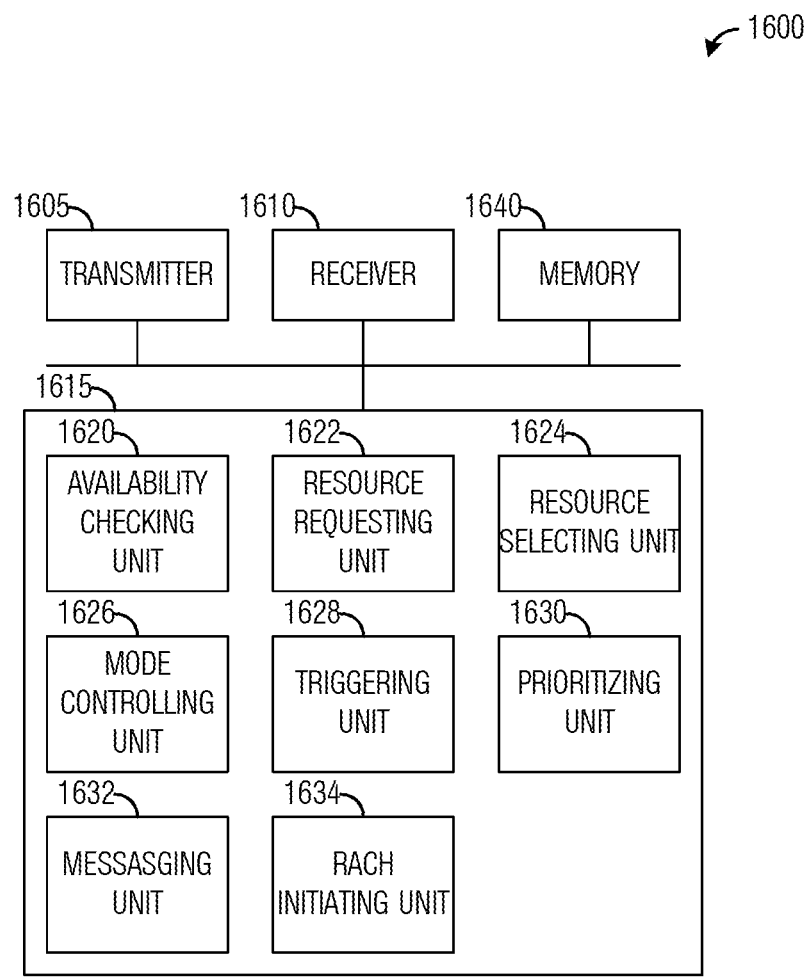
FIG. 16 illustrates an example communications device according to example embodiments described herein.

FIG. 16 illustrates an example communications device 1600. Communications device 1600 may be an implementation of a communications device, such as a UE, a mobile, a mobile station, a terminal, a subscriber, a user, and the like. Communications device 1600 may be used to implement various ones of the embodiments discussed herein. As shown in FIG. 16, a transmitter 1605 is configured to frames, cellular SRs, D2D-SRs, Prose-SRs, BSRs, data, and the like. Communications device 1600 also includes a receiver 1610 that is configured to receive frames, cellular SR configuration information, D2D-SR configuration information, resource grant information, and the like.

An availability checking unit 1620 is configured to determine if a resource, such as a cellular SR resource, a D2D-SR resource, and the like, is available. Availability checking unit 1620 is configured to determine if sufficient resources are available to transmit a BSR. Availability checking unit 1620 is configured to determine if sufficient resources are available to transmit data. A resource requesting unit 1622 is configured to request resources for a BSR by generating a SR (such as a cellular SR and/or D2D-SR). Resource requesting unit 1622 is configured to request resources for a data transmission by generating a BSR. A resource selecting unit 1624 is configured a resource for transmitting a frame. Resource selecting unit 1624 is configured to select a cellular SR resource for transmitting a cellular SR, a D2D-SR resource for transmitting a D2D-SR, a BSR resource for transmitting a BSR, a resource allocated for data to transmit data, and the like. A mode controlling unit 1626 is configured to select a D2D operating mode of communications device 1600. Mode controlling unit 1626 is configured to select a D2D Mode 1 or a D2D Mode 2 operating mode.

A triggering unit 1628 is configured to trigger a cellular SR and/or a D2D-SR in accordance with one or more rules. Triggering unit 1628 is configured to trigger a cellular SR if communications device 1600 has data to transmit. Triggering unit 1628 is configured to trigger a D2D-SR if communications device 1600 has data to transmit and if communications device 1600 is operating in D2D Mode 1. A prioritizing unit 1630 is configured to prioritize transmissions of communications device 1600 in accordance with one or more prioritizing rules. Prioritizing unit 1630 is configured to transmit cellular signals over D2D signals, for example. A messaging unit 1632 is configured to generate messages. Messaging unit 1632 is configured to generate a message including a cellular SR, a D2D SR, a BSR, data, and the like. A RACH initiating unit 1634 is configured to initiate a RACH procedure by making a RACH transmission. RACH initiating unit 1634 is configured to initiate a RACH procedure to obtain resources when existing resources are insufficient. A memory 1640 is configured to store communications system resource allocations, allocation information, D2D operating modes, selected resources, rules for triggering cellular SR and/or D2D-SR, rules for prioritizing cellular signals and/or D2D signals, messages, data, and the like.

The elements of communications device 1600 may be implemented as specific hardware logic blocks. In an alternative, the elements of communications device 1600 may be implemented as software executing in a processor, controller, application specific integrated circuit, or so on. In yet another alternative, the elements of communications device 1600 may be implemented as a combination of software and/or hardware.

As an example, receiver 1610 and transmitter 1605 may be implemented as a specific hardware block, while availability checking unit 1620, resource requesting unit 1622, resource selecting unit 1624, mode controlling unit 1626, triggering unit 1628, prioritizing unit 1630, messaging unit 1632, and RACH initiating unit 1634 may be software modules executing in a microprocessor (such as processor 1615) or a custom circuit or a custom compiled logic array of a field programmable logic array. Availability checking unit 1620, resource requesting unit 1622, resource selecting unit 1624, mode controlling unit 1626, triggering unit 1628, prioritizing unit 1630, messaging unit 1632, and RACH initiating unit 1634 may be modules stored in memory 1640.

Although the present disclosure and its advantages have been described in detail, it should be understood that various changes, substitutions and alterations can be made herein without departing from the spirit and scope of the disclosure as defined by the appended claims.

What is claimed is:

1. A method for operating a device-to-device (D2D) device, the method operating:
   determining, by the D2D device, an availability of a D2D buffer status report (BSR) resource and that the D2D device has also a cellular signal to transmit in a subframe corresponding to a D2D scheduling request (D2D-SR) resource; and
   in response to determining that the D2D BSR resource is not available,
   generating, by the D2D device, a D2D-SR message in accordance with D2D-SR configuration information, the D2D-SR message requesting allocation of an uplink resource for transmission of a D2D BSR message;
   transmitting, by the D2D device, the D2D-SR message to a base station over a D2D-SR resource, the D2D-SR resource being associated with D2D-SR message types, wherein transmitting the D2D-SR message over the D2D-SR resource indicates, to the base station, that the D2D-SR message is requesting the uplink resource for a D2D communication purpose;
   prioritizing the cellular signal and the D2D-SR message in accordance with a prioritizing rule; and
   transmitting one of the cellular signal and the D2D-SR message in accordance with the prioritizing in the subframe corresponding to the D2D-SR resource.

2. The method of claim 1, wherein the D2D-SR message is transmitted over a D2D-SR resource and not a cellular SR resource.

3. The method of claim 1, further comprising receiving the D2D-SR configuration information.

4. Method of claim 3, wherein the D2D-SR configuration information is received from an evolved NodeB (eNB).

5. The method of claim 1, wherein the D2D-SR configuration information specifies that the D2D-SR message is transmitted over a DD-SR resource and not a cellular SR resource.

6. The method of claim 1, further comprising identifying a format 3 physical uplink control channel (PUCCH) resource specified by a mathematical formula as the D2D-SR resource, and wherein transmitting the D2D-SR message comprises transmitting the D2D-SR message in the format 3 PUCCH resource.

7. The method of claim 6, wherein the mathematical formula is a function of at least one of a D2D-radio network temporary identifier (RNTI), a user equipment identifier (UE-ID), and a subframe number.

8. The method of claim 1, further comprising identifying a new PUCCH format resource as the D2D-SR resource, and wherein transmitting the D2D-SR message comprises transmitting the D2D-SR message in the new PUCCH format resource.

9. The method of claim 1, further comprising identifying a subset of subframes containing possible D2D-SR resources, and wherein transmitting the D2D-SR message further comprises:
   determining that the D2D-SR resource is available when the D2D-SR resource is within the subset of subframes.

10. The method of claim 9, wherein the subset of subframes is identified with a formula expressible as $$(10 \times n_f + \lfloor n_s/2 \rfloor - N_{OFFSET,SR}) \bmod SR_{PERIODICITY} = 0,$$

where $n_f$ is a system frame number, $n_s$ is a slot number within a radio frame, $N_{OFFSET,SR}$ is a SR SR subframe offset, and $SR_{PERIODICITY}$ is a SR periodicity in number of subframes.

11. A method for operating a device-to-device (D2D) device, the method comprising:
   transitioning, by the D2D device, from a D2D mode 1 to a D2D mode 2, wherein the D2D device transmits D2D signals over resources selected by the D2D device when operating in the D2D mode 1, and wherein the D2D device transmits D2D signals over resources scheduled by a network-side device when operating in the D2D mode 2;

triggering, by the D2D device, a first buffer status report (BSR) message to request a resource allocation to transmit direct data in response to transitioning from the D2D mode 1 to the D2D mode 2;

transitioning from the D2D mode 2 to the D2D mode 1; and stopping triggering of a second BSR message.

12. The method of claim 11, further comprising transmitting the first BSR message after the first BSR message is triggered.

13. The method of claim 11, wherein triggering the first BSR message comprises:

determining if there are sufficient resources to transmit the first BSR message;

if there are sufficient resources to transmit the first BSR message, triggering the first BSR message; and if there are not sufficient resources to transmit the first BSR message, generating a D2D-SR message in accordance with D2D-SR configuration information, the D2D-SR message including a request for a BSR resource, transmitting, by the D2D device, the D2D-SR message in a D2D-SR resource, receiving information about a resource grant for the BSR resource, and triggering the first BSR message in the BSR resource.

14. A device-to-device (D2D) device comprising:

a processor configured to determine an availability of a D2D buffer status report (BSR) resource, and to generate a D2D scheduling request (D2D-SR) message in accordance with D2D-SR configuration information when the D2D BSR resource is not available, the D2D-SR message requesting allocation of an uplink resource for transmission of a D2D BSR message; and a transmitter operatively coupled to the processor, the transmitter configured to transmit the D2D-SR message to a base station over a D2D-SR resource when the D2D BSR resource is not available, the D2D-SR resource being associated with D2D SR message types, wherein transmission of the D2D-SR message over the D2D-SR resource indicates, to the base station, that the D2D-SR message is requesting the uplink resource for a D2D communication purpose, wherein the transmitter is also configured to transmit a cellular signal in a subframe corresponding to the D2D-SR resource, wherein the processor is further configured to prioritize the cellular signal and the D2D-SR message in accordance with a prioritizing rule, and wherein the transmitter is further configured to transmit one of the cellular signal and the D2D-SR message in accordance with the prioritizing in the subframe corresponding to the D2D-SR resource.

15. The D2D device of claim 14, further comprising a receiver operatively coupled to the processor, the receiver configured to receive the D2D-SR configuration information.

16. The D2D device of claim 14, wherein the D2D-SR configuration information specifies that the D2D-SR message is transmitted over a D2D-SR resource and not a cellular SR resource.

17. The D2D device of claim 16, wherein the processor is configured to identify a new PUCCH resource as the D2D-SR resource, and wherein the transmitter is configured to transmit the D2D-SR message in the new PUCCH resource.

18. The D2D device of claim 16, wherein the processor is configured to identify a subset of subframes containing possible D2D-SR resources, and to determine that the D2D-SR resource is available when the D2D-SR resource is within the subset of subframes.

19. The D2D device of claim 14, wherein the processor is configured to identify a format 3 physical uplink control channel (PUCCH) resource specified by a mathematical formula as the D2D-SR resource, and wherein the transmitter is configured to transmit the D2D-SR message in the format 3 PUCCH resource.

* * * * *